United States Patent
Garg et al.

(10) Patent No.: US 9,733,836 B1
(45) Date of Patent: Aug. 15, 2017

(54) SYSTEM AND METHOD FOR GRANULAR DEDUPLICATION

(71) Applicant: Violin Memory Inc., Santa Clara, CA (US)

(72) Inventors: Amit Garg, Cupertino, CA (US); Timothy Stoakes, One Tree Hill (AU); Vikas Ratna, Fremont, CA (US)

(73) Assignee: VIOLIN MEMORY INC., Santa Clara, CA (US)

(*) Notice: Subject to any disclaimer, the term of this patent is extended or adjusted under 35 U.S.C. 154(b) by 1 day.

(21) Appl. No.: 15/017,046

(22) Filed: Feb. 5, 2016

Related U.S. Application Data

(60) Provisional application No. 62/114,849, filed on Feb. 11, 2015.

(51) Int. Cl.
*G06F 3/06* (2006.01)

(52) U.S. Cl.
CPC .......... *G06F 3/0608* (2013.01); *G06F 3/065* (2013.01); *G06F 3/067* (2013.01); *G06F 3/0619* (2013.01); *G06F 3/0641* (2013.01); *G06F 3/0665* (2013.01)

(58) Field of Classification Search
None
See application file for complete search history.

(56) References Cited

U.S. PATENT DOCUMENTS

| | | | |
|---|---|---|---|
| 8,850,130 B1* | 9/2014 | Aron | G06F 9/52 711/150 |
| 9,191,437 B2* | 11/2015 | Feder | H04L 67/1002 |
| 2011/0137870 A1* | 6/2011 | Feder | G06F 17/3015 707/662 |
| 2012/0226741 A1* | 9/2012 | Tofano | H04L 67/2804 709/203 |
| 2013/0117286 A1* | 5/2013 | Gallant | G06F 7/24 707/752 |
| 2013/0117516 A1* | 5/2013 | Sobolewski | G06F 12/16 711/162 |
| 2013/0227111 A1* | 8/2013 | Wright | G06F 9/5083 709/223 |
| 2013/0232261 A1* | 9/2013 | Wright | H04L 41/50 709/224 |
| 2015/0339587 A1* | 11/2015 | Huang | G06N 3/0436 706/2 |

* cited by examiner

*Primary Examiner* — Kevin Verbrugge
(74) *Attorney, Agent, or Firm* — Brinks Gilson and Lione

(57) ABSTRACT

A method of managing a memory system is described, the memory system having a processor with a client interface, a buffer memory, and a storage memory. A LUN (logical unit) is exposed to the client, the LUN having a memory size, and QoS specification. When the processor receives a command from the client to write data to the LUN, determining if the QoS specification includes deduplication and: if the QoS does not include deduplication, processing the command by storing the data in the storage memory and creating metadata uniquely referencing a storage location of the data that is written; or if the QoS includes deduplication, determine if deduplication is possible while meeting a latency value as specified in the QoS specification and performing deduplication.

3 Claims, 3 Drawing Sheets

SYSTEM AND METHOD FOR GRANULAR DEDUPLICATION

This application claims the benefit of U.S. provisional application Ser. No. 62/114,849, filed on Feb. 11, 2015, which is incorporated herein by reference.

TECHNICAL FIELD

The subject matter of the present application may be related to data storage systems.

BACKGROUND

Flash memory arrays are replacing disk storage devices in many applications due to the more rapid response time to client requests for reading and writing data as well as a capability to perform a much higher number of input/output (I/O) operations per second. However, at present, the hardware cost of the flash memory is greater than that of disk and the flash memory is perceived to have a wear out problem, at least if not properly managed.

The effective storage capacity of the flash memory system may be increased substantially by the use of deduplication and data compression techniques. However each of these techniques involves computational resources and may increase the latency of the storage system in ingesting and acknowledging write operations and in the response to read operations. In addition, such techniques may need to be harmonized with other data center operations such as replication, snapshots, cloning, and the like, including reconfiguration of the storage space allocated to the user based on changing workload characteristics.

User data may be presented in block format or in file format as each of these formats may be extant in the user environment to take advantage of particular user software programs and to support user applications where the data format is chosen for efficiency in processing or data handling by the user.

At present, deduplication is performed either in-line, by post-processing, or during a data backup process. In a multi-user environment, the processing workloads, input and output latencies, and other time-dependent attributes of the workloads may result in inefficient use of the storage system and data management features, as the choice of the process to be performed is deterministic. Typically deduplication is performed by only one of the three mentioned approaches in a particular storage system. This may result in a variable user experience

SUMMARY

A method of managing a memory system, comprising: providing a memory system with a processor having a client interface, a buffer memory, and a storage memory; allocating a logical unit (LUN) to the client, the LUN having a memory size, and QoS specification; receiving a command from the client to write data to the LUN; and determining if the QoS specification includes deduplication and: if the QoS does not include deduplication, process the command by storing the data in the storage memory and creating metadata uniquely referencing a storage location of the data that is written; or if the QoS includes deduplication, determine if deduplication is possible while meeting a latency value as specified in the QoS specification and: if deduplication is possible, performing deduplication and creating metadata relating a user address to a physical location where a copy of the data that is written is stored; or, if deduplication is not possible, storing undeduplicated data in a backing LUN associated with a deduplicated LUN, and draining undeduplicated data stored in the backing LUN when deduplication is possible by performing deduplication.

A method of managing a memory system, comprising: maintaining a single instance repository (SIR), the SIR comprising metadata relating a hash value to a location in the memory system where the data is stored; associating a plurality of logical units (LUN), with the SIR, each LUN being exposed to a user and having a stub LUN (SL) relating a user logical block address (LBA) to a hash value of data in the SIR or to a location in the memory system where the data is stored, wherein hash values in the SIR comprise hash values that are referenced by at least one of a plurality of LBAs in a LUN or by a plurality of LUNs; and the SIR is garbage collected by: determining whether the hash value is referenced by one or more LUNs and: in accordance with a policy determined by user quality of service requirements (QoS), evicting the hash value and associated stored data if the hash value is not referenced by any LUN; or evicting the hash value and associated stored data if the hash value is not referenced by any LUN for more than one garbage collection cycle; or evicting the hash value if the hash value is referenced by a LUN and the hash value has not been referenced for a predetermined period of time; maintaining the hash value and associated stored data if the hash value is referenced by more than one LUN.

DETAILED DESCRIPTION

Figure 1:
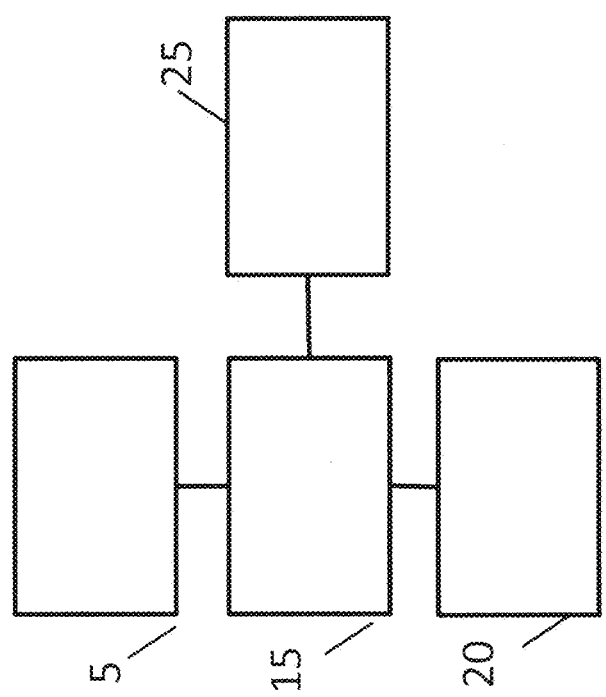
FIG. 1 is a block diagram of an example of a non-volatile memory storage system.

Exemplary embodiments may be better understood with reference to the drawings, but these embodiments are not intended to be of a limiting nature. Like numbered elements in the same or different drawings perform equivalent functions. Elements may be either numbered or designated by acronyms, or both, and the choice between the representation is made merely for clarity, so that an element designated by a numeral, and the same element designated by an acronym or alphanumeric indicator should not be distinguished on that basis.

It will be appreciated that the methods described and the apparatus shown in the figures may be configured or embodied in machine-executable instructions, e.g. software, or in hardware, or in a combination of both. The machine-executable instructions can be used to cause a general-purpose computer, a special-purpose processor, such as a DSP, array processor, or the like, that acts on the instructions to perform functions and actions described herein.

Alternatively, the operations might be performed by specific hardware components that may have hardwired logic or firmware instructions for performing the operations described, or by any combination of programmed computer components and custom hardware components, which may include analog circuits. Such components may include Application Specific Integrated Circuits (ASIC), Field Programmable Gate Arrays (FPGA), or the like which may exist or are being developed and have the capability of configurable logic.

The methods may be provided, at least in part, as a computer program product that may include a non-volatile (non-transient) machine-readable medium having stored thereon instructions which may be used to program a computer (or other electronic devices) to perform the methods. For the purposes of this specification, the terms "machine-readable non-transient medium" shall be taken to include any medium that is capable of storing or encoding a sequence of instructions or data for execution by a computing machine or special-purpose hardware and that may cause the machine or special purpose hardware to be operable to perform any one of the methodologies or functions of the present invention. The term "machine-readable medium" shall accordingly be taken include, but not be limited to, solid-state memories, optical and magnetic disks, magnetic memories, and optical memories, as well as any equivalent device that may be developed for such purpose.

For example, but not by way of limitation, a machine readable medium may include read-only memory (ROM); random access memory (RAM) of all types (e.g., S-RAM, DRAM. P-RAM); programmable read only memory (PROM); electronically alterable read only memory (EPROM); magnetic random access memory; magnetic disk storage media; Flash memory, which may be NAND or NOR configured; memory resistors; or electrical, optical, acoustical data storage medium, or the like. A volatile memory device such as DRAM may be used to store the computer program product provided that the volatile memory device is part of a system having a power supply, and the power supply or a battery provides power to the circuit for the time period during which the computer program product is stored on the volatile memory device.

For purposes of claim interpretation, the memory for storing a computer program product is "non-transient," where such a definition is given the broadest interpretation in terms of applicable memory types and techniques consistent with governing case law. Functions that are performed by a computer operable to process and execute the code may be equivalently performed by an electronic circuit.

Furthermore, it is common in the art to speak of software, in one form or another (e.g., program, procedure, process, application, module, algorithm or logic), as taking an action or causing a result. Such expressions are merely a convenient way of saying that execution of the instructions of the software by a computer or equivalent device causes the processor of the computer or the equivalent device to perform an action or a produce a result, as is well known by persons skilled in the art.

When describing a particular example, the example may include a particular feature, structure, or characteristic, but every example may not necessarily include the particular feature, structure or characteristic. This should not be taken as a suggestion or implication that the features, structure or characteristics of two or more examples should not or could not be combined, except when such a combination is explicitly excluded. When a particular feature, structure, or characteristic is described in connection with an example, a person skilled in the art may give effect to such feature, structure or characteristic in connection with other examples, whether or not explicitly described.

A non-volatile memory system 10, shown in a simplified block diagram in FIG. 1 may comprise an interface to the user system 5 and a processor 15 communicating with a flash memory array 20 comprising circuits having blocks of memory, each block comprising a plurality of pages. A random access memory 25, which may at least one of volatile memory or non-volatile memory (e.g., NVRAM) depending on the specific function, may be used as a buffer or working memory. The attributes of a flash memory array 20 (which may be termed an all flash array (AFA)) of low latency, and random read and write access may permit efficient and flexible application of such processes as deduplication, compression and encryption of the data, although each one of the processes consumes other system resources such as processing time line and internal data transfer bandwidth.

The user system 5 may represent a plurality of users each having differing storage requirements as to size of the data extent to be stored and the format in which the data is to be stored. The users may be in communication with the memory systems over a network, which may be a local area network (LAN), fiber channel (FC), the Internet, or the like, For convenience of description, one may describe the memory system capability made available to a user or using application as being embodied in a construct which may be termed a LUN. Traditionally this means logical unit number. Here we use the term to identify a storage extent that is made available to a user, where the storage extent may have specific attributes. For example the attributes may include quality of service (QoS) measures such as average and maximum read or write latency, bandwidth, storage capacity, or the like. The provisioning of the storage space may be described as "thick" or "thin", where the former is a situation where the LUN memory extent is predetermined and reserved for the user of the LUN "owner" and the latter is a situation where the memory extent at any time is determined by the amount of data being stored at that time. Where additional memory space is needed for a thin LUN, the space is allocated from a general pool of memory of the storage array and any limitations on the amount of memory that may be claimed by a LUN may be determined by a system policy. Each LUN may be provided with storage management functions such as replication, snapshots or the like, and the data itself may be deduplicated or compressed depending on user needs.

From an economic viewpoint, data deduplication and data compression are desirable as the user data may be stored in a substantially smaller data extent than the source data extent. It is believed that a typical user application will experience a reduction in data storage requirements of about 5:1 due to deduplication and about 2:1 for data compression, although these factors are known to be generalizations which may not be correct for a specific user LUN. However, the processing needed to perform these operations may introduce latency; and, the system architecture needs to accommodate a variety of data management tools contemporaneously and perhaps on a LUN-scale or even logical block address (LBA) granularity. There may be circumstances where LUNs that were deduplicated and compressed may need to be expanded, and where undeduplicated and uncompressed LUNs need to be deduplicated and compressed. Indeed, for example, a mirrored LUN may have one deduplicated and compressed form and another undeduplicated and uncompressed form simultaneously and the storage locations of each of the mirrored data may not be co-located.

Traditional constructs such as Network Attached Storage (NAS) and Storage Attached Networks (SAN), Direct Attached Storage (DAS) and the like are usually associated with specific data transport hardware and software protocols and interoperability of these constructs has been limited. A large memory array, such as an all-flash array (AFA), which may be a FLASH memory array 20, may be used for mixed workloads having the attributes of previous generation storage mechanisms since the scale size of an AFA may have available processing or storage resources substantially in excess of most individual user or application needs for processing capability and storage extent.

So, a user LUN, as used herein means some designated handle, tag or the like, by which a user addresses the storage system so as to read, write or otherwise manage data. The user LUN may be the client interface and include the QoS specification. Such data management activities may also include the operation of user programs within the memory system for any purpose, such as file management, transaction processing, data base management or the like. Each user LUN may have QoS features, data security and reliability features, management features such as clones and the like, that differ from any other LUN. User LUNs may be subdivided and assigned differing QoS requirements where, for example, the LUN is exposed to a user hypervisor and the memory system LUN is subdivided such that one or more virtual machines may be serviced by the sub-LUNs which may have differing QoS or other attributes.

The memory system may harmonize these requirements such that the resources are effectively used, taking account of the dynamic demands, for example, of the individual LUNs. Each user LUN may have a different diurnal, weekly, monthly behavior, including boot storms, accounting period closings, business transactions or the like.

We first describe the underlying architecture of an example of such a system when dealing with various data processing and storage activities, and then indicate some of the methods by which the performance of the described system may be adapted to the aggregated user demands.

For purposes of explanation some terms and acronyms are used which are similar, but not necessarily identical to traditional terms. Such terms are intended to be open in construction such that additional features may be present that are not specifically asserted to be included in the definition.

Figure 2:
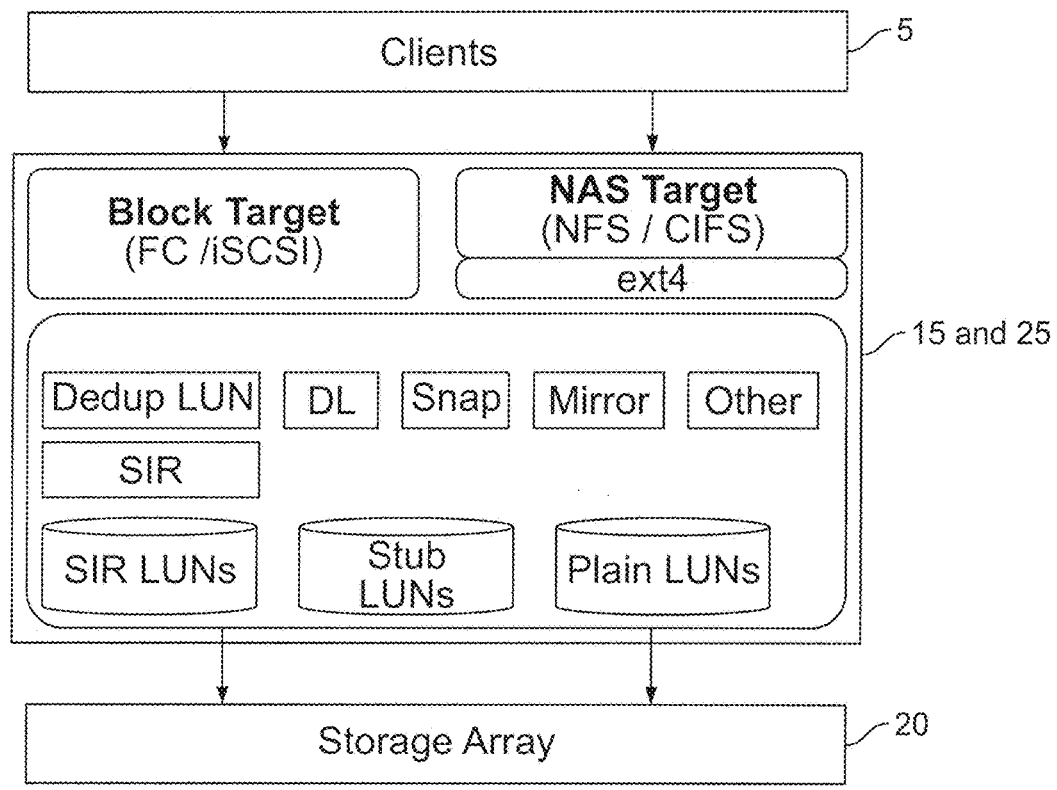
FIG. 2 illustrates an example of the allocation of functionality to hardware elements in the storage system.

A LUN corresponding to a user LUN may be operated as a traditional LUN, either thick or thin, where multiple instances of the data may be stored, or as a deduplicated LUN (DL). See FIG. 2.

In an example, the data of a DL is processed for deduplication in 4 KB blocks. Although this block size may correspond to a page size in some user applications, the data in the block may be comprised of a lesser size such as a plurality of 512 B chunks representing the user sector, page or block, or the block may be a portion of the user page, where the user page is larger than 4 KB. The choice of a deduplication block size is governed by a number of factors which may include, for example, the typical user page size, the amount of metadata needed to track the deduplicated data, and the method chosen for purging the deduplicated data when that data is no longer referenced by the users.

The deduplication processing includes computing of a hash value for the block. An example of a cryptographic hash function is SHA1. This is a 20-byte hash result which can be computed using the functionality of an Intel or other processor instruction set. Other hash functions may be used and choice of such a function is a trade-off between speed and uniqueness of the result in the context of the hardware and software environment. Other non-cryptographic hash functions may be used. Such non-cryptographic functions may necessitate a byte-by-byte comparison of the data with the stored data that would be pointed to so as to avoid erroneous identification of the data as having already been stored. For the greatest protection against data mismatch, a strong hash and data compare may be used. Such requirements may be a part of the QoS.

Deduplication involves storing a single copy of a data block to represent a plurality of identical data blocks being referenced by more than one user or user LBA, where the location of the stored data block is referenced through the deduplication metadata. The deduplicated data block is stored in a logical array called a "Single Instance Repository" (SIR). The actual SIR data may be stored in physical locations in the storage array 20 that may coexist with locations of non-deduplicated data in a physical data space. The data in the SIR has been deduplicated, but the SIR also contains single instances of the data where there is no duplicate data reference in the entire pool of user data being serviced by the SIR. The SIR may also have the hash value repository used to identify data that has been subject to the deduplication process whether the data is duplicate, or non-duplicate data.

Generally the operations being described herein are identified with logical data constructs and manipulations, so that apparently separate logical representations may be stored in the physical memory array in locations determined as is convenient at the time. The SIR may be part of a hierarchy where the referenced data is stored in a location in an AFA 20 that is associated with, but may not be co-located with, the SIR. Moreover, the SIR may be accessible by deduplication processes being performed on a plurality of clustered processors. So, a particular DL may be associated with a SIR instance stored on a remotely located AFA, as an example.

The SIR may therefore serve a plurality of clients, and the clients may reside in different physical or logical locations. Some clients may be responsible for data ingest, for replication or the like and others for performing housekeeping functions for the metadata, such as garbage collection (GC). Still others may be responsible for scrubbing (revalidating) the data to protect against data loss due to memory faults or data degradation over time.

Where the computed hash value of the data matches that of a previously stored data block, a duplicate of the data has been identified, and only metadata referring to the new data need be stored.

A storage system may compress the stored data, whether it has been deduplicated or not. A single compression algorithm such as LZO may be used, or an algorithm may be chosen from a plurality of algorithms such that the compression ratio is optimized, for example, to the data type or an aspect of the QoS. A single instance of the data resulting from the deduplication process is stored in the "Single Instance Repository" (SIR) and the data may be compressed for storage therein. The SIR represents the data that is subject to the deduplication process and represented by a hash value. As such each stored data element is "unique" and multiple occurrences of the data in logical address space are mapped to a single data element representation. Note that the present discussion presumes that the hash function is sufficiently robust that no two data sets will result in the same hash value. To the extent that a hash function is not believed to ensure that each stored data instance is unique, there are known methods of checking a hash match to avoid data loss or errors which may be used. The choice of a combination of the processes may depend on the user QoS requirements and on internal system policies that facilitate balancing of overall storage system resources.

The term QoS is intended to connote both express and implied user requirements and may be applied at various levels of granularity: e.g., a sub-LUN, a LUN or a grouping of LUNS. In addition to dynamically adjusting the deduplication and compression operations so as to meet QoS requirements, a pre-programmed time-varying QoS may be used. Such pre-programmed requirements may be aggregated for the system so as to define peak loading for purposes of avoiding over-commitment of resources at a specific time.

In another aspect, the user latency may be used to set a performance criterion that may be comprised of a plurality of internally defined latencies. While the user experience may be expressed as a latency at the system interface, the components of the latency may be comprised of, for example, the latency of the array in responding to read or write commands, the latency to perform deduplication, the latency to perform compression and the latency associated with GC. Each of these latency measures may be expected to vary, and not necessarily in the same temporal manner, as the dynamic data processing consumes varying amounts of system resources. Each of the latencies may be a component of a policy where the dynamic allocation of resources, including storage memory may be used to fulfill the user QoS requirement. Alternatively, the various LUNs may be assigned a relative priority.

In an example, a deduplicated LUN (DL) may be comprised of a logical connection to a SIR and a stub LUN (SL) whose purpose is to manage the user-LBA-to-deduplicated data mapping using metadata. In other examples, the SL may also reference or actually contain data. The DL may have a size determined by the user, but may be thin provisioned, as the amount of space associated with the SIR may not be bounded. A fixed number of bytes of the SL, perhaps 32 B, may be used to describe each 4 KB user block and the SL may be configured as a thin LUN so as to adapt to the actual data storage needs.

Figure 3:
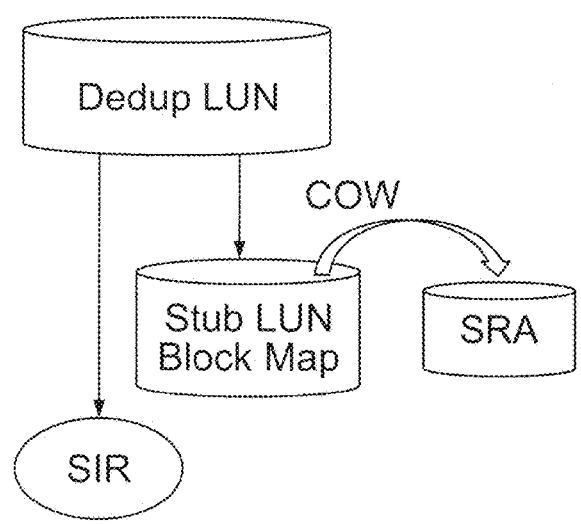
FIG. 3 illustrates an example of the operation of a deduplicated LUN during a snapshot operation.

In an example, the data storage process may include receiving I/O operations from the user and assembling sufficient data to be stored to fill a 4 KB block stored temporarily in NVRAM, which may be redundant. NVRAM any be considered to represent any storage medium where the data is protected from loss due to a power failure. Each user request may be promptly acknowledged since the data has been securely stored. The block is hashed and a lookup is performed to determine if the data is already within the SIR. If the data is already stored, the SL may be managed to associate the LBA with the SIR data location. Otherwise, the data is stored in the SIR and metadata created. A DL may have an associated SRA (snapshot resource area) so that snapshots may be performed where the SL is copy-when-written (COW) to the SRA when new data is written after the snapshot (FIG. 3). As such no actual data is moved, just the referencing information. Similarly the DL may be cloned by cloning the SL contents without moving the referenced data. Data may be erased or overwritten by modifying the referencing information.

The LUN may be mirrored so that the DL points to another (target) DL or a conventional LUN (that is non-deduplicated). The mirror DL may have a separate SIR or use the same SIR as the source DL. Data may need to be moved from the source SIR to the destination SIR if they were different SIRs and, for example, a hash lookup indicated that the data was not already present. As the data is being moved, the target SL would be updated. The target DL may be co-located with the source DL or may be remotely located.

As mentioned, the SIR itself stores data on conventional (non-deduplicated) LUNs on the AFAs. These LUNs may be encrypted, backed up, or have other conventional activities performed thereon. Moreover, such LUNs may be either thick or thin provisioned. So, either a common SIR may be maintained for all of the stored data, or a plurality of SIRs may be maintained where each SIR may be associated with one or more DLs. As is evident from this discussion, a LUN may be defined at various levels in a storage system, but the each LUN may be selectively exposed to other LUNs or to the user at differing levels of the storage system.

As the data in a SL needed to describe the stored data (location, number of references) of a deduplicated block may be small (e.g., tens of bytes) a plurality of such updates to the SL may be batched and atomically stored to the SL. The user application often exhibits LBA locality and this may improve efficiency when the metadata from such LBAs has been grouped in the SL.

Over a period of time, some of the stored data may be modified or deleted by the users. Where the user page size equals that of the deduplicated block, for example, the data may be deleted from the SIR when the data is no longer referenced by any user LBA. This deletion may be deferred until scheduled or event-driven maintenance operations are performed on the SIR. Deletion of the underlying data is termed garbage collection (GC). This should be distinguished from the garbage collection activity that also may occur on the AFA in managing the flash chips, where blocks of physical pages are erased to free up physical memory space. Here, the block is still being treated as a logical entity and the GC is being performed with respect to the logical space.

When the individual user I/O operations are of less than a deduplication block size, a type of logical space fragmentation occurs. For example, in a 4 KB (or KiB) block comprised of a plurality of individual 512 B user I/O operations, one or more of the 512 B segments of the block may be deleted or modified. (Note that, without loss of generality, the distinction between binary and decimal measures of the size of data elements would be understood to refer to whatever the actual stored or processed data may be. However, it is somewhat awkward to use decimal descriptions below about 4096 bytes.) So, an input block having only one different 512 B segment will not have the same computed hash value as the existing block and will be treated as a new unique data block, even though 7 of the 8 segments are unchanged with respect to a previously deduplicated block. The garbage collection process needs to periodically or aperiodically scan the SLs so as to identify the situations where two or more SIR blocks are referenced by the same user LBA and determine which is the obsolete data. The SIR block with the obsolete LBA reference may need to be read and processed so as to either insert the new LBA data in place, or the valid LBA redistributed so that the modified or deleted segment may be excised from the SIR. This excision process may be performed asynchronously with the process of data storage and retrieval so as to purge the SIR of obsolete data of a size that is the same or commensurate with the deduplication block size.

When a deduplicated data chunk has been completely de-referenced, deletion of the data from the SIR may be in accordance with a protocol where the deletion is delayed, if there are sufficient resources to retain the data. This may reduce the computational activity where only a few LUNs reference the data, but the frequency of referencing the data with the particular hash value is high. One way to reduce churning of the SIR is to adjust the periodicity of the GC so as to leave some of the more recent de-referenced data blocks in the SIR, rather than immediately evicting the blocks.

So, when data is ingested into the storage system from a user, the user LUN designation determines the type of processing to be performed. Data management services such as replication, snapshotting and the like may be performed on the data as received, and the data for each LUN may then then be blocked together for storage either as deduplicated, non-deduplicated data that is compressed or not compressed as appropriate to the LUN specification. In an alternative, the incoming data may be processed on a global basis.

System resources are limited, in any practical system. So unless the system is substantially overprovisioned (either with respect to storage capacity, processing capacity, interface capacity, or the like) the temporal variation in demands by the users may result in transient system bottlenecks. Yet, it is an objective of a modern storage system to appear to be substantially immune to such shortfalls. Operations such as deduplication and compression, for example, consume system processing resources, memory resources and internal bus bandwidth.

Where the volume of data to be deduplicated and compressed exceeds the processing capacity at a time, for example, some or all of the data being written or replicated or otherwise added to a DL may be stored in the form that it was received. Where this expedient is resorted to, the system latency may not be compromised; however, the storage efficiency may be temporarily less that desired. When the system resources permit, the un-deduplicated data in the DL may be post-processed so as to determine whether a duplicate does actually exist. If there is a duplicate then the appropriate SIR location is referenced, freeing up the space.

The architecture of the stub LUN (SL) may be organized as a file system where the mixture of metadata for deduplicated or non-deduplicated data is stored. Each deduplicated block may be described by a DDU (deduplication data unit), which is the metadata for a de-duplicated chunk, which may be smaller than a deduplicated block. Each of the DDUs points to a physical storage location, usually through several levels of indirection and the data may be either duplicate data or unique data. Each of the stored chunks may be compressed or not, in accordance with a policy.

During background processing data that is non-deduplicated may become de-duplicated, for example, and the DDU may point to the location of the de-duplicated data in the SIR.

Various administrative operations are facilitated by the storage architecture. In an example, a LUN having non-deduplicated data may be converted into a DL. One could associate a new DL as a mirror target with an existing non-deduplicated LUN and perform a syncing process, including deduplication of the mirror DL. Once this has been completed, the mirroring link may be broken and the original non-deduplicated LUN deleted.

In another aspect, deduplication of a non-deduplicated LUN may be performed in place. The LUN would be associated with a SIR and the contents of the LUN ingested through the input deduplication path. Data chunks that are de-duplicated may be replaced with stub metadata (DDU). Once the process is completed, the source LUN is now the stub LUN (SL). Since the number of entries in the SL is less than the number of entries in the DL, the DL can be thinned out. Where SCSI commands can be used, UNMAP commands may be used, as an example. Incoming read commands during processing would be directed to the DL or the original LUN as appropriate. Incoming write operations may be processed for deduplication according to the QoS requirements.

One may envisage that the reverse process may be performed. In the mirroring example, a DL can be mirrored to a LUN and after synchronization the mirror is broken and the source DL deleted.

The deduplication process may be disabled, either by the user changing the QoS requirements, or in accordance with a system policy so as to maintain QoS across a plurality of user LUNs. This may be done by the system assigning an additional LUN that is associated with the existing DL. The entire DL may be processed so as to create a LUN having undeduplicated data. Alternatively, the incoming write data is directed the undeduplicated LUN and incoming reads directed to the DL of the deduplicated LUN as appropriate at the time of the operation. Where the use of this additional LUN is for the purpose of load balancing, the data stored in the LUN may be processed for deduplication as previously described so as to free up memory and logical space.

A person of skill in the art would appreciate that the examples above provide methods where the storage system may balance resources while providing a separate QoS, for example, to each of the user LUNs, and such methods may be used in a variety of useful configurations, only some of which have been described in detail.

One may consider a configuration where all of the available physical storage of a memory array is a global resource or storage pool. Storage is allocated from the global pool to service LUNs (thick or thin) as and when they are needed to meet the requirements of the LUNs exposed to the user. System-allocated LUNs such as DL make use of the storage allocated from the global pool.

A deduplicated LUN (DL) may be thought of as the LUN and a stub LUN (SL) where the SL is metadata that tracks the location of the deduplicated data in the LUN. The deduplicated data may be stored in a global LUN such that only a single instance of a particular deduplicated block is stored, regardless of the source of the data. Generally the storage efficiency of the deduplication process is improved as the size of the common deduplicated data set increases as common data between a plurality of LUNs is only stored once. There may be practical limits on the common data pool and a plurality of such SIRs may be established. Further, where there is a concern about data security, the SIR may be restricted to a particular family of user LUNS.

Deduplication may not therefore be a property of a LUN, but may be the state of a block of a LUN at any particular time, and that property may be changed by a system process depending, for example, on storage utilization, deduplication efficiency and current throughput or latency requirements.

Each LUN exposed to the user may be characterized by the user-expressed requirements of storage capacity, QoS and the like, as well as experiential information such as average deduplication factor and average compression factor. Other time varying characteristics such as average and peak write and read requirements may be determined either continuously or periodically. From the ensemble of such LUN characteristics, the throughput capability and memory may be allocated by a storage system so as to make efficient usage of the storage and processing capability. Other processes such as GC and observable parameters such as churn rate or the like may also be considered in establishing system policies.

Transient peak requirements for writing to a LUN may be met either by processing the data in a routine manner or by temporarily altering the process without visibility to the user. For example, if the latency for writing data is increasing due to the combined writing operations of a plurality of users, some of the data may be directed temporarily to un-deduplicated LUNs and when the writing load decreases, the data may be post-processed so as to drain the data out of the un-deduplicated LUN into the associated DL using techniques that have already been described, or similar approaches. Reading of data is less affected by deduplication processing as the reading of data is primarily a matter of looking up the data physical location using the already composed metadata.

However, similarly, maintenance operations such as GC, as background processes may be allocated more or less of the processing timeline depending on the foreground processing load and the urgency of the background process.

Figure 4:
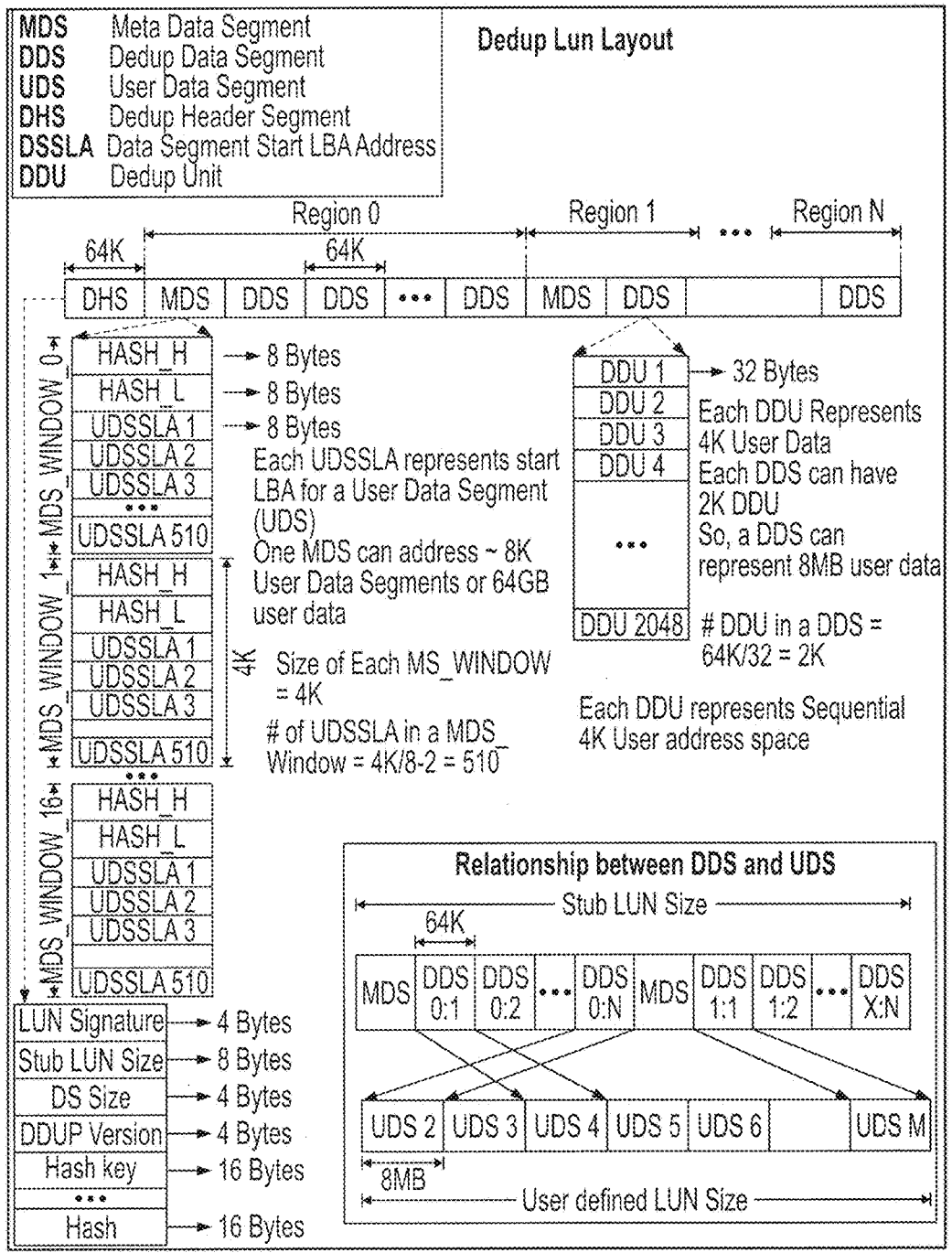
FIG. 4 illustrates the relationships in a data structure that may be used to organize the metadata in a deduplicated LUN.

In an aspect, data addressed to a DL may be deduplicated with respect to the contents of the SIR and optionally compressed inline. The stub SL stores the meta-data, while the actual data is stored in a SIR LUN. The metadata stored in SL facilitates the retrieval of user data for read operations. In an example, shown in FIG. 4, a SL for a DL may be comprised of a plurality of data structures commencing with a header segment (DHS) and partitioned into a plurality of regions. The DHS may include a LUN identifier, SL size and information related to the hash function used. The space following the DHS may be divided into a plurality of regions, which may be of equal size and comprise a metadata segment (MDS) and a plurality of deduplicated data segments (DDS). The metadata segment contains information of user addressable LBAs that have already been written to and may be divided into, for example, 4 KB chunks, which may be called a MDS_Window. This structure is primarily used to store the start address of the user data segment (UDS). The size of an MDS may be 64 KB, for example and there may be 16 MDS_Windows for each MDS.

The entire user addressable space (the LUN size) may be divided into segments of a fixed size and each of them may be referred to as a UDS. The start address of a segment is stored in the MDS when a write is performed to an address that is within the segment and the LBA start address may be referred to as a UDSSLA. The UDS may be, for example 8 MB. Where sizes of data and metadata are given, they are not meant to be limiting. Rather they are provided to assist in understanding the concepts by providing a relative sizing of elements of a relatively small example.

Deduplicated data segments (DDS) follow the MDS in the LUN layout where there multiple corresponding DDS which are fixed in size and correspond to a UDS. The size of a DDS may be 64 KB, for example. The DDS may contain 32 B data structures referred to as DDU (deduplicated data units) that may contain information on the location of data in the SIR for a 4 KB address range. The metadata of a DDU may comprise, for example, the compressed length, the uncompressed length, the SIR identification, a cyclic redundancy code (CRC) for data protection and the hash value.

When methods are described it should be understood that the ordering of the steps is illustrative and steps the method may be combined, omitted, reordered, repeated or the like without departing from the teachings of the disclosure. Similarly, in the claims, the use of letter or numerical identification of clauses is for clarity in description and does not imply a restriction on the sequence of performance of the steps in the method.

Although the present invention has been explained by way of the examples described above, it should be understood to the ordinary skilled person in the art that the invention is not limited to the examples, but rather that various changes or modifications thereof are possible without departing from the spirit of the invention.

What is claimed is:

1. A method Of managing a memory system, comprising:
   providing a memory system with a processor having a client interface, a buffer memory, and a storage memory;
   allocating a logical unit (LUN) to the client, the LUN having a memory size, and QoS specification;
   receiving a command from the client to write data to the LUN; and
      determining if the QoS specification includes deduplication and:
      if the QoS does not include deduplication, process the command storing the data in the storage memory and creating metadata uniquely referencing a storage location of the data that is written; or
      if the QoS includes deduplication, determine if deduplication is possible while meeting a latency value as specified in the QoS specification and:
         if deduplication is possible, performing deduplication and creating metadata relating a user address to a physical location where a copy of the data that is written is stored; or,
         if deduplication is not possible, storing undeduplicated data in a backing LUN associated with a deduplicated LUN, and
         draining undeduplicated data stored in the backing LUN when deduplication is possible by performing deduplication.

2. A method of managing a memory system, comprising:
   providing a memory system with a processor having a client interface, a buffer memory, and a storage memory;
   maintaining a metadata relating a hash value to a location in the memory system where the data is stored;
   associating a plurality of logical units (LUN), with a SIR (single instance repository), each LUN being exposed to a user and having a stub LUN (SL) relating a user logical block address (LBA) to a hash value of data or to a location in the memory system where the data is stored,
   wherein hash values comprise hash values that are referenced by at least one of a plurality of LBAs in a LUN or by a plurality of LUNs; and
   the hash values are garbage collected by:
      determining whether the hash value is referenced by one or more LUNs and:
      in accordance with a policy determined by user quality of service requirements (QoS),
      evicting the hash value and associated stored data if the hash value is not referenced by any LUN; or
      evicting the hash value and associated stored data if the hash value is not referenced by any LUN for more than one garbage collection cycle; or
      evicting the hash value if the hash value is referenced by a LUN and the hash value has not been referenced for a predetermined period of time;
      maintaining the hash value and associated stored data if the hash value is referenced by more than one LUN.

3. The method of claim 2 wherein, the metadata is stored in the SIR.

* * * * *

UNITED STATES PATENT AND TRADEMARK OFFICE
CERTIFICATE OF CORRECTION

PATENT NO. : 9,733,836 B1
APPLICATION NO. : 15/017046
DATED : August 15, 2017
INVENTOR(S) : Amit Garg et al.

It is certified that error appears in the above-identified patent and that said Letters Patent is hereby corrected as shown below:

In the Claims

In Column 12, Claim 1, Line 7, before "managing a memory system," replace "Of" with --of--.

In Column 12, Claim 1, Line 18, before "storing the data" insert --by--.

Signed and Sealed this
Nineteenth Day of December, 2017

Joseph Matal
*Performing the Functions and Duties of the*
*Under Secretary of Commerce for Intellectual Property and*
*Director of the United States Patent and Trademark Office*